US008346315B2

(12) United States Patent
Lindoff et al.

(10) Patent No.: US 8,346,315 B2
(45) Date of Patent: Jan. 1, 2013

(54) POWER-AWARE SELECTION OF RADIO ACCESS TECHNOLOGY

(75) Inventors: Bengt Lindoff, Bjärred (SE); Jacobus Cornelis Haartsen, Hardenberg (NL); Anders Wallén, Eslöv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1090 days.

(21) Appl. No.: 11/852,726

(22) Filed: Sep. 10, 2007

(65) Prior Publication Data
US 2009/0068969 A1    Mar. 12, 2009

(51) Int. Cl.
    *H04M 1/00* (2006.01)
(52) U.S. Cl. .......... 455/574; 455/343.2; 455/127.5; 455/436; 370/311; 370/318; 370/230; 370/338; 370/347
(58) Field of Classification Search .......... 455/572–574, 455/127.1, 127.5, 343.1–343.5, 432.1–444, 455/456.1–457; 370/311, 318, 230, 338, 370/347
See application file for complete search history.

(56) References Cited

U.S. PATENT DOCUMENTS

| | | | |
|---|---|---|---|
| 6,119,003 A | 9/2000 | Kukkohovi | |
| 6,400,946 B1 | 6/2002 | Vazvan et al. | |
| 6,735,432 B1* | 5/2004 | Jarett et al. | 455/417 |
| 6,748,246 B1* | 6/2004 | Khullar | 455/574 |
| 6,970,708 B1* | 11/2005 | Raith | 455/440 |
| 6,987,729 B1* | 1/2006 | Gopalakrishnan et al. | 370/230 |
| 7,430,420 B2* | 9/2008 | Derakhshan et al. | 455/452.2 |
| 2005/0143143 A1* | 6/2005 | Schwartz et al. | 455/574 |
| 2007/0099619 A1* | 5/2007 | Parekh et al. | 455/439 |
| 2007/0129045 A1* | 6/2007 | Aerrabotu | 455/343.5 |
| 2007/0147317 A1* | 6/2007 | Smith et al. | 370/338 |
| 2007/0263574 A1* | 11/2007 | Lu et al. | 370/338 |
| 2007/0291728 A1* | 12/2007 | Dalsgaard et al. | 370/347 |
| 2008/0076432 A1* | 3/2008 | Senarath et al. | 455/442 |

FOREIGN PATENT DOCUMENTS

| | | |
|---|---|---|
| EP | 0 896 493 | 2/1999 |
| EP | 1 524 877 | 4/2005 |
| GB | 2346507 A | 8/2000 |
| GB | 2 403 870 | 1/2005 |
| GB | 2403870 A | 1/2006 |
| WO | 02/03733 | 1/2002 |
| WO | 0203733 A1 | 1/2002 |
| WO | 2004031488 A1 | 4/2004 |
| WO | 2005/006722 | 1/2005 |
| WO | 2005/109942 | 11/2005 |

OTHER PUBLICATIONS

Agusti, Ramon. "Radio Resource Management in Beyond 3G Systems." Electrotechnical Conference, 2006. MELECON 2006. IEEE Mediterranean. May 16-19, 2006, pp. 569-574. ISBN: 1-4244-0087-2.

Tasic, Aleksandar et al. "Adaptive Multi-Standard Circuits and Systems for Wireless Communications." Circuits and Systems Magazine, IEEE, vol. 6, No. 1, 2006, pp. 29-37.

* cited by examiner

*Primary Examiner* — Junpeng Chen
(74) *Attorney, Agent, or Firm* — Coats & Bennett, P.L.L.C.

(57) ABSTRACT

Methods and apparatus are disclosed for operating a multi-mode wireless communications device to select a radio access technology (RAT) requiring the lowest energy consumption by the device for a desired operating mode. An exemplary method comprises scanning a plurality of frequency bands to determine a set of available radio access technologies that support the desired operating mode, and evaluating, for each available RAT, RAT-specific system parameters and RAT-specific operating conditions. Based on the evaluation, the RAT requiring the lowest energy consumption by the wireless device for the desired operating mode is selected.

24 Claims, 5 Drawing Sheets

POWER-AWARE SELECTION OF RADIO ACCESS TECHNOLOGY

BACKGROUND

1. Technical Field

The present invention generally relates to methods and apparatus for selecting a radio access technology at a multi-mode wireless communications device. In particular, the present invention relates to methods and apparatus for selecting a radio access technology that minimizes the energy consumption required to support a desired operating mode at the wireless device.

2. Background

For the foreseeable future, a variety of wireless communications systems will exist in parallel. For example, several cellular systems co-exist today in many regions. A single wireless operator may maintain a GSM network as well as a Wideband Code-Division Multiple Access (W-CDMA) network, with overlapping coverage between the two. Multiple operators may also maintain different radio access technologies in any given area, with varying degrees of interoperability permitted between them. As wireless systems continue to evolve, additional standards-based cellular technologies, such as those developed by the $3^{rd}$ Generation Partnership Project (3GPP) as part of its "Long-Term Evolution" (LTE) initiative, will also be deployed, often in parallel with previously available technologies. In addition to the cellular systems, other wireless technologies, such as wireless local area network (WLAN) and "WiMax" technologies, will be widely available, often side-by-side with each other and with cellular technologies.

Furthermore, deployment of a given technology at any given time is likely to be uneven, with operators providing different stages of technology evolution at different locations. For example, with respect to 3GPP's W-CDMA technology, even a single operator might have different releases, such as Release 5, 6, or 7 of 3GPP's High-Speed Packet Access (HSPA) technology, deployed at different locations.

Thus, at any given time, a wide variety of radio access technologies (RATs) will be accessible to a mobile wireless device as it moves from region. Frequently, multiple RATs will be accessible at the same location, offering similar or overlapping services, such as voice, data, or messaging services.

Multi-mode wireless devices, i.e., devices designed to support two or more RATs, are now commonly available. These devices are also evolving to support more radio access technologies and to provide enhanced services and more flexibility to their users.

In the typical multi-mode device, selection between multiple radio access technologies is governed by pre-determined preferences established by a wireless operator. These preferences are typically enforced by means of codes programmed into a Subscriber Identity Module (SIM) card provided by the operator, which regulate a user's access to services. Thus, a wireless device will typically attempt to connect to a "preferred" RAT, provided that it is available at the device's current location. If it is not available, then a next-preferred RAT will be accessed.

In today's devices, the preferred RAT is not chosen with optimal power consumption at the wireless device in mind. In fact, the selection of the RAT can have serious implications for the energy consumption at the wireless device, and thus for the battery life between re-charging. These implications vary, depending on which services are used by the wireless device. Thus, depending on the operating mode of the wireless device, energy consumption will vary. In addition, for any given operating mode, energy consumption at the wireless device will vary depending on which RAT is selected. Past experience has shown that lower energy consumption, which translates directly into longer battery life between charges, is a key criterion in ensuring consumer satisfaction with mobile devices.

SUMMARY

The present invention provides methods and apparatus for operating a multi-mode wireless communications device to select a radio access technology (RAT) requiring the lowest energy consumption by the device for a desired operating mode. An exemplary method comprises scanning a plurality of frequency bands to determine a set of available radio access technologies that support the desired operating mode, and evaluating, for each available RAT, RAT-specific system parameters and RAT-specific operating conditions. Based on the evaluation, the RAT requiring the lowest energy consumption by the wireless device for the desired operating mode is selected.

In one or more embodiments, the evaluation of the RAT-specific system parameters and RAT-specific operating conditions comprises determining an energy consumption metric for the desired operating mode based on the RAT-specific system parameter and RAT-specific operating conditions. The subsequent selection of the preferred RAT is based on the determined energy consumption metrics.

A wireless device configured to support the above method, and variations of it, comprises a multi-mode radio section configured to scan one or more frequency bands to determine a set of available RATs that support the desired operating mode. The radio section is further configured to determine one or more RAT-specific operating conditions, including a RAT-specific path loss. The wireless device further comprises a control section configured to evaluate, for each available RAT, RAT-specific system parameters and the RAT-specific operating conditions, to select the RAT requiring the lowest energy consumption by the device for the desired operating mode.

Of course, the present invention is not limited to the above features and advantages. Indeed, those skilled in the art will recognize additional features and advantages upon reading the following detailed description, and upon viewing the accompanying drawings.

DETAILED DESCRIPTION

It should be understood that the following description, while indicating several embodiments of the invention, is given by way of illustration only. Various changes and modifications within the scope of the invention will become apparent to those skilled in the art. Furthermore, although only a few radio access technologies are discussed below, those skilled in the art will appreciate that the methods and apparatus disclosed herein are applicable to numerous radio access technologies currently deployed, as well as to emerging and future technologies.

Figure 1:
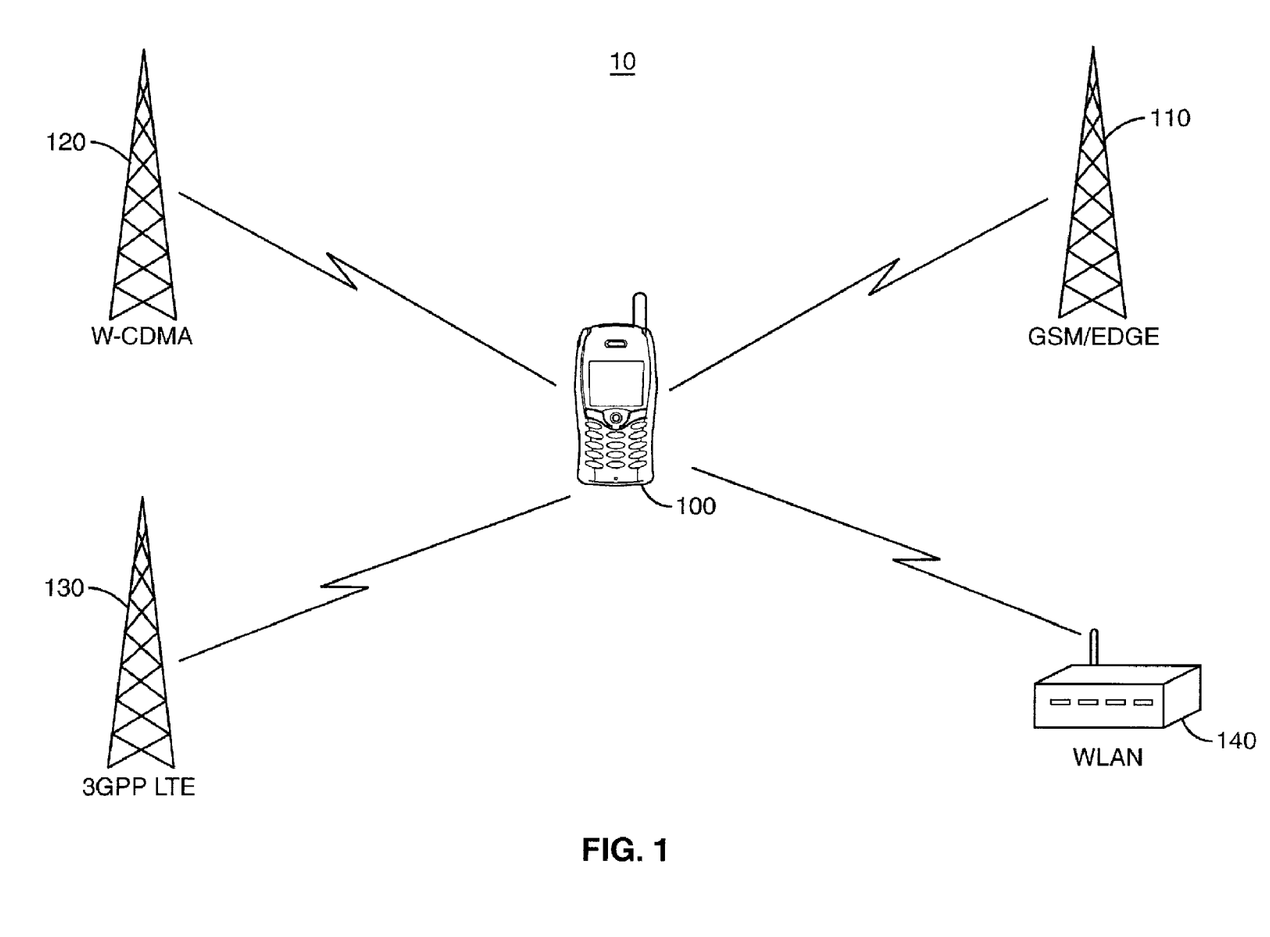
FIG. 1 illustrates a communications network in which an embodiment of the invention may be implemented.

FIG. 1 illustrates a wireless communications system 10, in which a multi-mode wireless communications device 100 is configured to communicate using any of several radio access technologies (RATs). As a non-limiting example, wireless device 100 can communicate using GSM/EDGE 110, W-CDMA 120, or 3GPP LTE 130. In addition, wireless device 100 supports WLAN technology 140. Thus, wireless device 100 transmits voice or data signals to another terminal device (not shown) or other network node (not shown) using any of the pictured RATs 110, 120, 130, or 140. Any or all of these RATs may provide access to a Public Switched Telecommunications Network (PSTN), facilitating conventional voice calling services, or to the Internet or other data networks. In addition to voice services, any or all of these RATs may provide access to a variety of data services, such as messaging, Internet browsing, retrieval and distribution of multimedia files, multimedia streaming services, and so on. Several of these RATs may be operated by the same wireless operator, or each may be maintained by a separate service provider.

For a given service, or operating mode, the energy consumed by wireless device 100 will vary depending on which RAT is selected. The energy consumption will depend at least partly on RAT-specific system parameters. For example, assuming that W-CDMA RAT 120 is deployed according to 3GPP Release 99, Release 5, or Release 6, then conventional speech services will often consume more energy at wireless device 100 than if GSM 110 were used. However, if W-CDMA RAT 120 supports 3GPP Release 7, then discontinuous reception (DRX) and discontinuous transmission (DTX) features introduced with Releases 7's Continuous Packet Connectivity (CPC) services become available. With these features available, W-CDMA RAT 120 may be the preferred selection, in terms of energy consumed at wireless device 100.

On the other hand, GSM 110 and W-CDMA 120 may be provided via geographically diverse base stations, even if the services are provided by the same operator. Thus, the path loss between wireless device 100 and the respective base stations may differ. As a result, the transmitter power level necessary to establish and maintain communications between wireless device 100 and GSM RAT 110 may be much lower than that required to maintain a connection between wireless device 100 and W-CDMA RAT 120. Of course, the exact power levels required, besides depending on the path loss, will also depend on the modulation formats and coding schemes employed by GSM RAT 110 and W-CDMA RAT 120, and will also vary with power control schemes employed to reduce and counter interference.

Accordingly, it will be understood by those skilled in the art that energy consumption at wireless device 100 will vary between RATs depending on one or more RAT-specific system parameters, as well as one or more RAT-specific operating conditions. These RAT-specific system parameters may include such parameters as the frequency or frequencies employed, whether or not DRX or DTX is available, and if so, the cycle intervals corresponding to those features. Other RAT-specific system parameters may include modulation formats, coding schemes employed, and so on. RAT-specific operating conditions include, for example, path loss, which depends on the physical location of wireless device 100 with respect to GSM RAT 110 or W-CDMA RAT 120. The mobility of wireless device 100, such as whether the device is stationary, moving slowly, or speeding along on a train, represents another operating condition, which will have a different impact on energy consumption from one RAT to another. For example, if a selected RAT employs large macrocells, handoff from one cell to another will be less frequent than if smaller cells are employed. A fast-moving wireless device 100 will thus tend to consume less energy in handoff-related activities in the large cells than in the smaller ones.

Finally, the energy consumption at wireless device 100 also varies depending on the operating mode. Of course, energy consumption will generally be far greater for a speech service mode than for an idle mode. However, even if GSM RAT 110 offers energy consumption advantages over W-CDMA 120 for speech mode, given particular system parameters and operating conditions, the opposite may be true for idle mode. For example, wireless device 100 may be physically located closer to GSM RAT 110 than W-CDMA RAT 120. This physical proximity, and the resulting lower path loss, can result in a much lower transmitter power requirement for accessing GSM RAT 110 than for W-CDMA RAT 120. Because the transmitter power amplifier is often the dominant energy user in speech and other active operating modes, selection of GSM RAT 110 is likely to result in lower energy use during a voice call under these circumstances. However, the situation may be quite different for idle mode. W-CDMA RAT 120 may require a lower duty cycle, necessitating less frequent or shorter "wake-up" intervals at the receiver of wireless device 100. Furthermore, the frequency bands employed by GSM RAT 110 and W-CDMA RAT 120 may affect the current consumed by the receiver circuitry in wireless device 100. Scanning intervals may also differ between the two RATs as well, and may depend on cell size as well as the mobility of wireless device 100.

Figure 2:
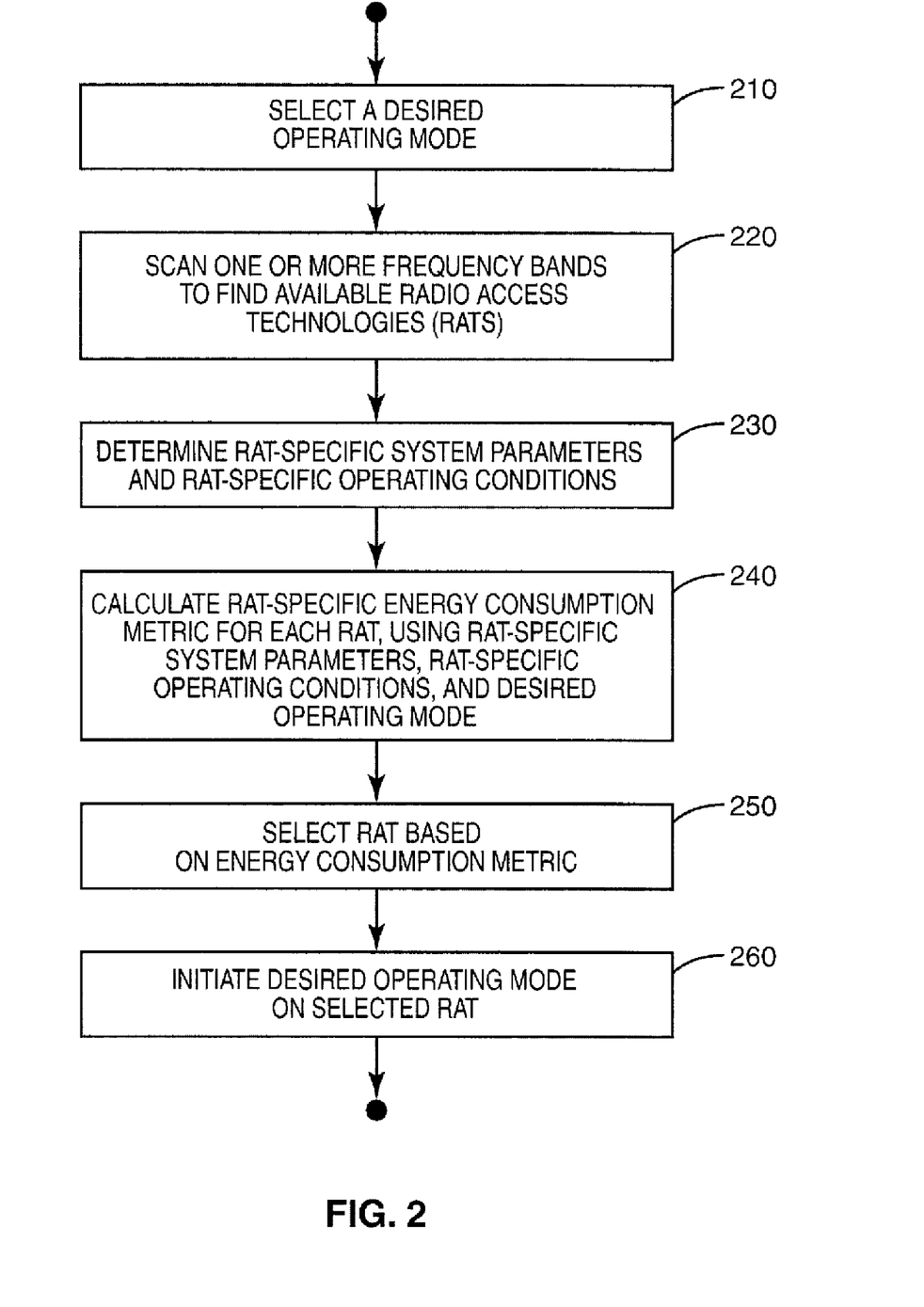
FIG. 2 is a logic flow diagram of one embodiment of processing logic for selecting a radio access technology.

Accordingly, minimizing energy consumption at wireless device 100 requires evaluation of RAT-specific system parameters as well as RAT-specific operating conditions, in view of a particular desired operating mode, to facilitate the selection of a preferred RAT in terms of device energy consumption. This process is illustrated in FIG. 2.

At block 210, a desired operating mode is selected. This selection may result from a user action, such as a user initiating a voice call, or may result from automatic operation of the wireless device 100, such as in response to a network-initiated page. The desired operating mode is selected from a variety of possible modes. Non-limiting examples include an idle mode, during which wireless device 100 can receive pages from the system, but is not actively sending data to an end application, and a user-initiated speech mode, in which the user of wireless device 100 has initiated a voice call. Other modes include, but are not limited to: a network-initiated speech mode, in which the network has initiated a voice call; one or more messaging modes, employing one or more services such as a short-message service (SMS), a multimedia messaging service (MMS), or an instant message/presence service (IMPS); or various data modes, such as a voice-over-Internet-Protocol (VoIP) session, a multimedia streaming session, or a video conference call session.

At block 220, wireless device 100 scans one or more frequency bands for available RATs. Wireless device 100 may be configured to support several frequency bands, such as the 800, 900, 1800, or 1900 MHz cellular and Personal Communications System (PCS) bands. Wireless device 100 may also support the 2100 MHz and/or the 2.6 GHz band, employed for 3G, LTE, or WiMAX systems, as well as a 2.5 GHz band utilized by WLAN technologies. During this scan, wireless device 100 may detect several RATs, operating in different frequency bands or even within different portions of the same frequency band. Two or more detected RATs may be provided from a single base station location, or each of the RATs may be provided from separate, geographically distinct base stations.

At block 230, wireless device 100 determines RAT-specific system parameters and RAT-specific operating conditions for each of the available RATs. "Available RATs" in this context may be taken to mean only those detected RATs that provide the desired service. For example, if a high-speed multimedia streaming session is allowed, then it is unnecessary to determine RAT-specific system parameters or operating conditions for a detected GSM voice-only RAT, since that RAT is incapable of providing the desired operating mode.

As discussed above, the RAT-specific parameters may include one or more of a variety of parameters. Some of these parameters may be determined by monitoring control signals transmitted by the corresponding RAT. Other parameters may be determined, after identifying the RAT, from data tables stored in wireless device 100.

Some RAT-specific operating conditions, such as a RAT-specific path loss, may likewise be determined by monitoring control signals transmitted by the corresponding RAT. For example, methods for estimating a path loss based on pilot signals are well known. Other operating conditions may be derived from other sources. For example, the mobility or speed of wireless device 100 may be determined by an embedded GPS receiver.

At block 240, wireless device 100 produces an energy consumption metric for each available RAT as a function of the desired operating mode, the RAT-specific system parameters, and the RAT-specific operating conditions. The calculation of this energy consumption metric may be quite complex in some embodiments. For example, the energy consumption metric might incorporate detailed energy-consumption figures corresponding to various functional units within wireless device 100, representing energy consumed by receiver circuits, transmitter circuits, and so on. The calculation might model dependencies upon operating frequency, or even operating temperature, and might incorporate energy consumption variation due to different data throughput requirements, different modulation and coding schemes. At the other extreme, the energy consumption metric may be determined simply by accessing a multi-dimensional look-up table stored in memory. This look-up table might be indexed by a relatively limited number of operating modes, RAT-specific system parameters, and RAT-specific system conditions; the values stored in the table need not be extremely precise, but only as precise as necessary to facilitate comparisons between RATs in different scenarios.

At block 250, wireless device 100 selects the RAT, based on the RAT-specific energy consumption metrics, which will provide the desired operating mode with the lowest expected energy consumption. The operating mode is initiated, using the selected RAT, at block 260.

Figure 3:
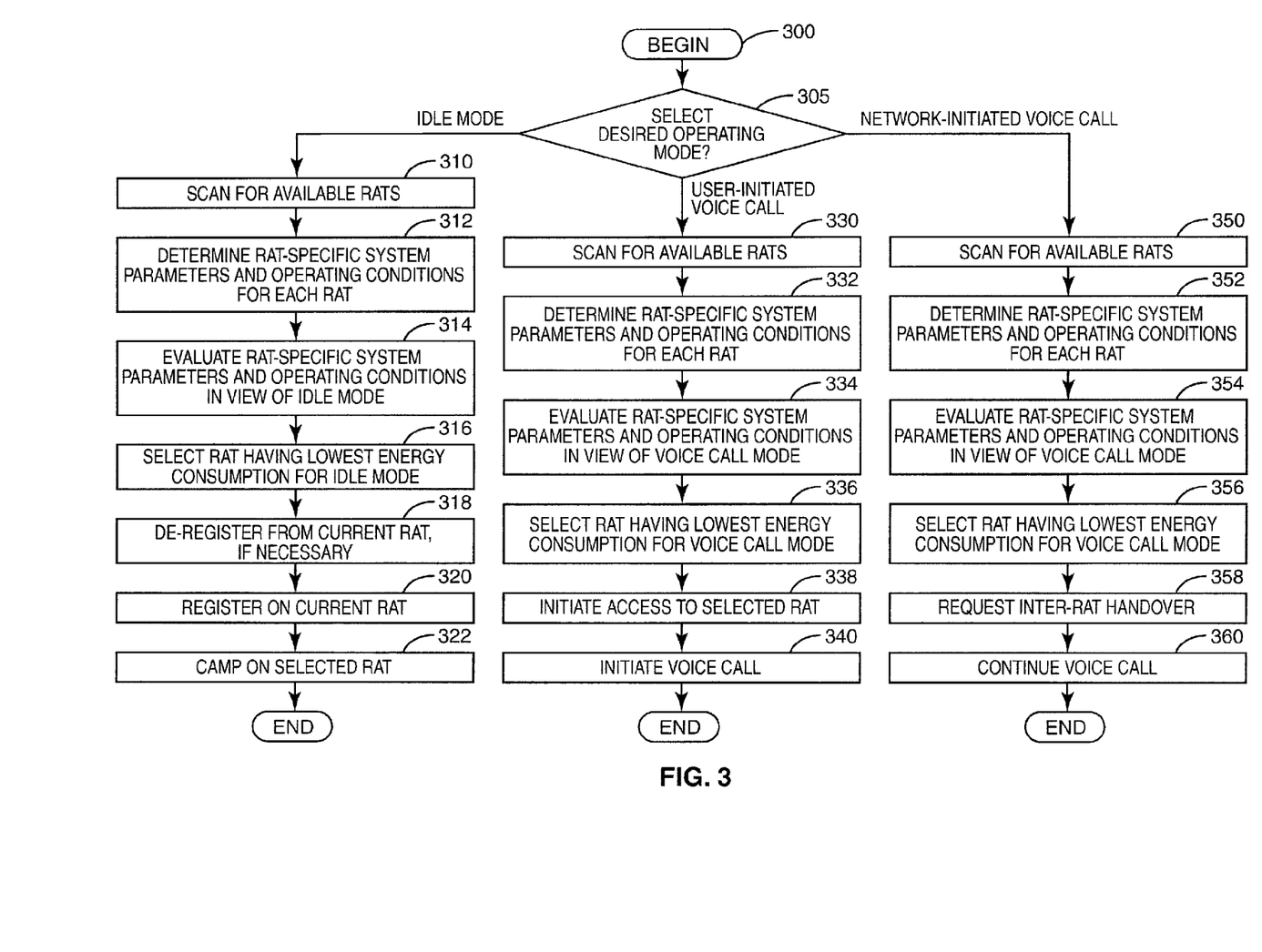
FIG. 3 is a logic flow diagram of another embodiment of processing logic for selecting and accessing a radio access technology.

Several scenarios in which the present invention may be used are illustrated in FIG. 3. The flow chart illustrates an exemplary sequence of operations for each of three operating modes: an idle mode, a user-initiated voice call mode, and a network-initiated voice call mode. These scenarios are illustrative and are not limiting; numerous other modes corresponding to various voice, data, and messaging services are possible.

The flow begins at block 300. Next, at block 305, a desired operating mode is selected. In FIG. 3, three possible operating modes are depicted. If the desired operating mode is idle mode, then processing continues at block 310.

At block 310, wireless receiver 100 searches for available RATs by scanning one or more frequency bands. As discussed above, several RATs may be accessible at any given location. However, not all of the accessible RATs will necessarily support the desired operating mode. Referring to the wireless communications system 10 depicted in FIG. 1, for example, it is likely that GSM RAT 110, W-CDMA RAT 120, and 3GPP LTE RAT 130 each support an idle mode in which wireless device 100 can be paged by other devices. However, WLAN RAT 140 may not support a service that allows wireless device 100 to be found and paged by callers. Thus, WLAN 140 may not be suitable for idle mode operation.

As each RAT is found, wireless device 100 extracts broadcasted information identifying the system, the supported standard, the applicable DRX interval, and so on. Thus, at block 312, wireless device 100 determines RAT-specific system parameters and operating conditions for each available RAT. Again, this step need not be performed exhaustively for RATs that do not support the desired operating mode. For instance, in the present example, parameters need not be determined for the WLAN RAT 140.

The precise system parameters and operating conditions that are determined in this step might also vary depending on the operating mode. For example, wireless device 100 may be programmed with an energy consumption model for idle mode that considers a receiver duty cycle but does not include any transmitter power consumption information. Accordingly, a path loss parameter, which might otherwise be used to estimate transmitter energy consumption, might not be necessary to evaluate RATs for idle mode operation.

At block 314, wireless device 100 evaluates the RAT-specific system parameters and operating conditions to determine which RAT offers the lowest device energy consumption. Importantly, this evaluation is performed in view of the desired operating mode. Thus, at block 314, wireless device 100 evaluates the energy consumption required to support idle mode for each RAT. As explained above, the model underlying an evaluation of idle mode operation energy consumption will differ dramatically from a model for energy consumption during a voice call.

At block 316, the preferred RAT, i.e., the RAT requiring the lowest energy consumption at wireless device 100, is selected. Determining the lowest energy consumption may involve comparing actual energy consumption estimates calculated for each RAT. These calculations may incorporate data detailing circuit energy consumption for various carrier frequencies, modulation schemes, transmitter output powers, etc., and may utilize energy consumption models derived from laboratory testing of wireless device 100 or representative devices. Alternatively, determining the lowest energy consumption may simply involve comparing energy consumption parameters retrieved from a look-up table indexed by operating mode and one or more RAT-specific system parameters and operating conditions.

At blocks 318, 320, and 322, wireless device 100 moves to and "camps" on the selected RAT. In other words, wireless device 100 begins (or continues) operating in idle mode, using the selected RAT. This may include de-registering from a current RAT, if necessary, as shown at block 318, and registering with the selected RAT so that wireless device 100 can be paged, as shown at 320. In any event, wireless device camps on the newly selected RAT, as shown at block 322. It is important to note that the selected RAT may not always correspond to the closest base station. For example, in a dense urban environment with many micro- and pico-base stations, wireless device 100 may select a RAT utilizing macro-cells with large area coverage. This will reduce the activity in wireless device 100 for supporting mobility—measuring neighboring cells, sending location updates, and so on. In particular, since idle mode transmissions are relatively infrequent, the higher transmit power may not be very relevant, even if this higher transmit power is explicitly considered in evaluating energy consumption for idle mode.

A process similar to that just described, but differing in some details, is followed in the case of a voice call mode. Referring back to block 305, assume that wireless device 100 is camped on a RAT, such as W-CDMA RAT 120. The user of wireless device 100 may initiate a voice call by, for example, entering a phone number using the device's keypad. Thus, the desired operating mode selected at block 305 is "user-initiated voice call," and processing continues at block 330.

As with the previous example, wireless device 100 searches for available RATs by scanning one or more frequency bands at block 330. However, in this case the suitability of each detected RAT is evaluated with respect to its ability to support a voice call. Thus, referring back to FIG. 1, WLAN 140 may be considered for a user-initiated voice call, provided that wireless device 100 includes support for VoIP, and can access a compatible service via WLAN 140. Note also that this search for available RATs may be conducted after the user initiates the phone call, but may also be periodically conducted in the background, so that available RAT information is more readily available when a change in operating mode is triggered.

At block 332, RAT-specific system parameters and RAT-specific operating conditions are determined for each RAT, in view of the anticipated voice call mode. As before, relevant parameters are derived from broadcasted information, or derived from data stored on wireless device 100, or both. For instance, information identifying the particular version of a given protocol supported by a base station may be used to see which speech services are supported by that RAT, and, as applicable, to determine the availability of DRX/DTX support and the corresponding cycle parameters.

The RAT-specific system parameters and RAT-specific operating conditions are evaluated at block 334 to determine the RAT offering the lowest overall energy consumption for a voice call by wireless device 100. This evaluation may be quite nuanced, resisting simple rules such as "W-CDMA is always better than GSM." For example, if W-CDMA RAT 120 is available but supports W-CDMA Releases 99, 5, or 6, then GSM RAT 110 or 3GPP LTE RAT 130 might be better choices, due to the lack of DRX/DTX support in the older W-CDMA releases. However, if W-CDMA RAT 120 supports HSPA Release 7, then this RAT might be a better choice.

Of course, the path loss will be an important factor to consider along with the availability of DRX/DTX support. The path loss factors heavily into an estimate of the transmitter power consumption, which constitutes the majority of the energy consumption in cases where the required transmitter power is relatively high. Thus, the path loss (perhaps along with other RAT-specific operating conditions) is evaluated along with the RAT-specific system parameters, such as DRX/DTX parameters. Accordingly, a W-CDMA Release 99 speech service could be chosen over GSM RAT 110 if the W-CDMA RAT 120 is much closer to wireless device 100 than GSM RAT 110. In this instance, the W-CDMA output power at wireless device 100 is likely to be quite low (perhaps less than −10 dBm), while communicating with GSM RAT 110 might require a significantly higher transmitter power (perhaps as high as +30 dBm). In this case, the lower duty cycle facilitated by GSM RAT 110 will not compensate for the higher required output power.

Carrier frequency and duplex arrangements are also factors in the evaluation of energy consumption in an active mode such as voice call mode. For instance, W-CDMA at 900 MHz has a smaller duplex distance (frequency difference between receive and transmit frequencies) than W-CDMA at 2100 MHz, often resulting in a higher transmitter loss in the radio-frequency circuitry. On the other hand, for a given distance, the path loss for W-CDMA at 2100 MHz will be higher than for W-CDMA at 900 MHz. All this information may be accounted for in the model underlying the evaluation of RAT-specific system parameters and operating conditions, whether this model is manifested in an explicit calculation of an energy consumption estimate or metric, or whether the model is instead represented in a look-up table.

At block 336, the RAT requiring the lowest energy expenditure by wireless device 100 is selected. Then, at block 338, the selected RAT is accessed, and the voice call is initiated at block 340. Note that in some cases wireless device 100 may be camping on one RAT, but select a different RAT for initiating a voice call. In these cases, accessing the selected RAT may include de-registering from the current RAT and registering at the new RAT. (These steps are not illustrated in FIG. 3.) In other cases, the selected RAT may not support network-initiated voice calls, but may be usable, for example, for outgoing VoIP calls. For instance, this may happen when WLAN 140 is accessible and will support voice calls initiated by wireless device 100. As discussed earlier, WLAN 140 may not have been considered as a candidate for idle mode, but may represent the best choice for a user-initiated voice call, due to the close proximity of the WLAN 140 access point and the low transmitter powers required. In such a case, it may be desirable to continue camping on the current RAT, so as to be accessible for pages and messages, but to place the outgoing voice call using WLAN 140, if wireless device supports such simultaneous operation.

Referring back, once more, to block 305, assume that wireless device 100 is camped on a RAT and receives a page, indicating an incoming phone call initiated by a remote user. In this case, wireless device 100 may select a desired operating mode of "network-initiated voice call." Thus, wireless device 100 searches for available RATs at block 350. In this context, the scanning may proceed somewhat differently than previously described. Consider that wireless device 100 is currently camped on one RAT, such as GSM RAT 110. In this case, the page was generated by GSM RAT 110, and wireless device 100 is required to respond to the page in accordance with the applicable standards-based protocol. This may require that the voice call be initiated on GSM RAT 110. Nonetheless, wireless device 100 may search for available RATs in the background, while maintaining its connection to GSM RAT 110.

At blocks 352 and 354, wireless device 100 obtains RAT-specific system parameters and operating conditions for each RAT, and evaluates those parameters and conditions to determine which available RAT offers the lowest energy consumption. Similar factors to those described above will apply.

At block 356, the RAT offering the lowest energy consumption is selected. In some cases, this will be the RAT currently servicing wireless device 100. In this case, no further action is required. However, in other cases, an alternative RAT may offer energy consumption savings. In these cases, if inter-RAT handover is supported, then an inter-RAT handover is requested at block 358. Upon completion of the inter-RAT handover, the voice call is continued at block 360.

Although not pictured in FIG. 3, the process described above for requesting an inter-RAT handover is also applicable to mobile-initiated calls. Because operating conditions will change over time, a RAT initially selected for a mobile-initiated call may not remain the best available in terms of energy consumption. Thus, during a call, whether mobile-initiated or network-initiated, wireless device 100 may continue to periodically scan for available RATs and to evaluate whether conditions have changed sufficiently to warrant a request for an inter-RAN handover.

Figure 4:
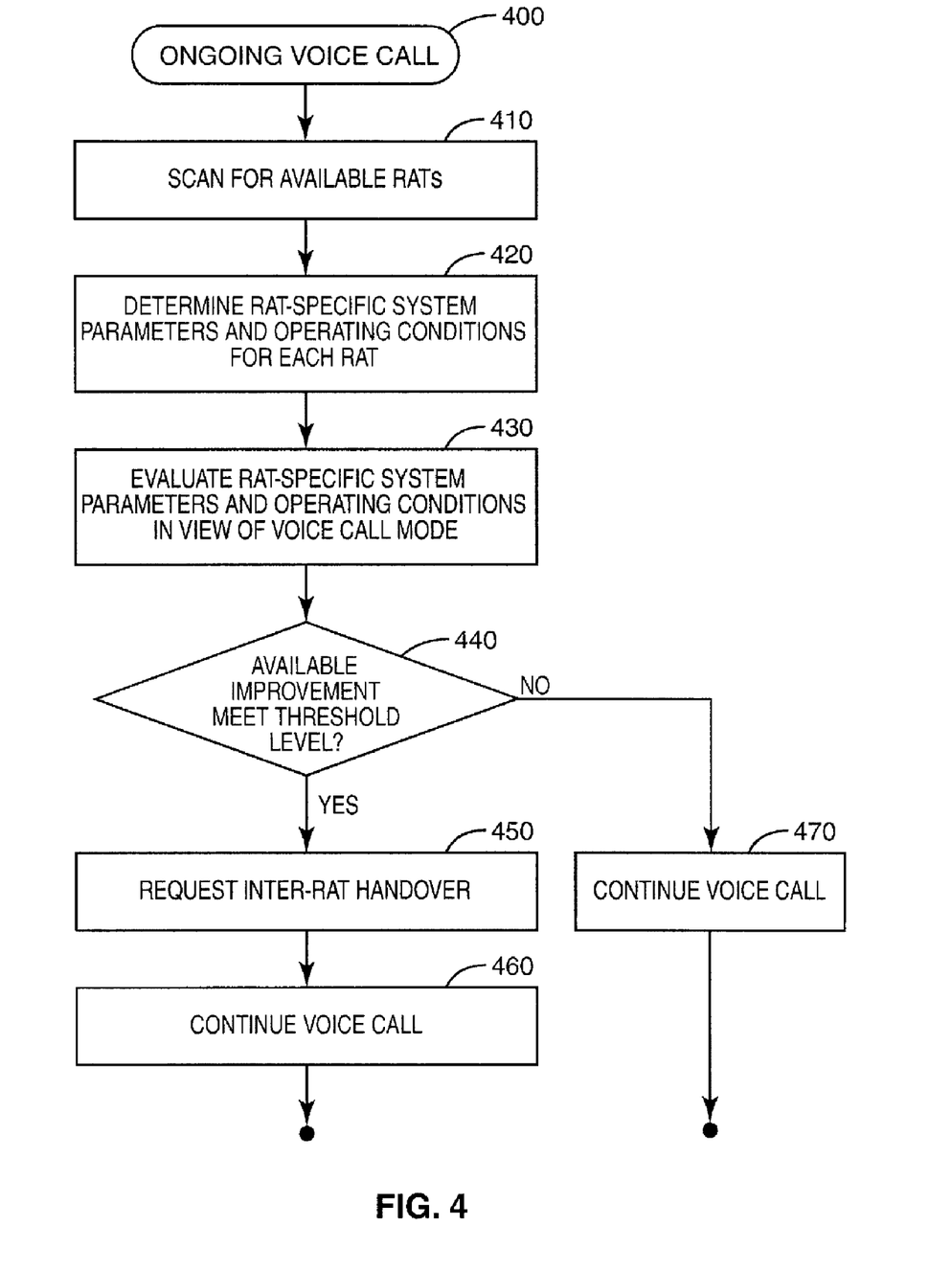
FIG. 4 is a logic flow diagram of another embodiment of processing logic for selecting and accessing a radio access technology.

This process is illustrated in FIG. 4. The flow begins at block 400, with an ongoing voice call. At block 410, wireless device 100 scans for available RATs. This scanning for alternative RATs may be combined with normal scanning and measurement procedures, or may be a separate, perhaps less frequent, procedure. Wireless device 100 determines RAT-specific system parameters and operating conditions for each RAT at block 420, and evaluates those system parameters and operating conditions in view of voice call mode at block 430. Because it may be undesirable to frequently switch between RATs, wireless device 100 may require a threshold level of improvement before requesting an inter-RAT handover. In other words, if the energy consumption requirements for two RATs are reasonably close, wireless device 100 may refrain from requesting an inter-RAT handover during a call, even if the alternative RAT may offer a small improvement in energy consumption. Thus, at block 440, wireless device evaluates whether the preferred RAT, i.e. the RAT offering the lowest energy consumption, will provide an improvement in energy consumption that meets a predetermined threshold requirement. If so, then an inter-RAT handover is requested at block 450, and the voice call continues at block 460, but on the new RAT. If not, then the voice call continues on the current RAT, at block 470. Although not pictured in FIG. 4, this process may be periodically repeated, whether or not an inter-RAT handover is performed. As a result, several inter-RAT handovers may be performed during a single voice call.

Thus, those skilled in the art will appreciate that the methods described above and pictured in FIGS. 3 and 4 are only exemplary, and do not represent the only approach for the operating modes discussed. Those skilled in the art will also understand that the exemplary processes described above, and variants thereof, may be applied to a wide variety of operating modes. For example, wireless device 100 may support a number of active data modes, each with particular throughput requirements or quality of service requirements, or both. Energy consumption for a particular data mode will generally vary depending on RAT-specific system parameters and RAT-specific operating conditions, just as described above. For example, W-CDMA/HSPA Release 7, currently under development, will offer Continuous Packet Connectivity (CPC), which will facilitate energy-saving sleep cycles for a variety of data services, such as instant messaging. Thus, DRX cycle intervals, as discussed above, will be directly relevant for these modes. Numerous other system parameters may be considered in evaluating energy usage associated with a given RAT and a given operating mode, as discussed in general and exemplary terms above.

Figure 5:
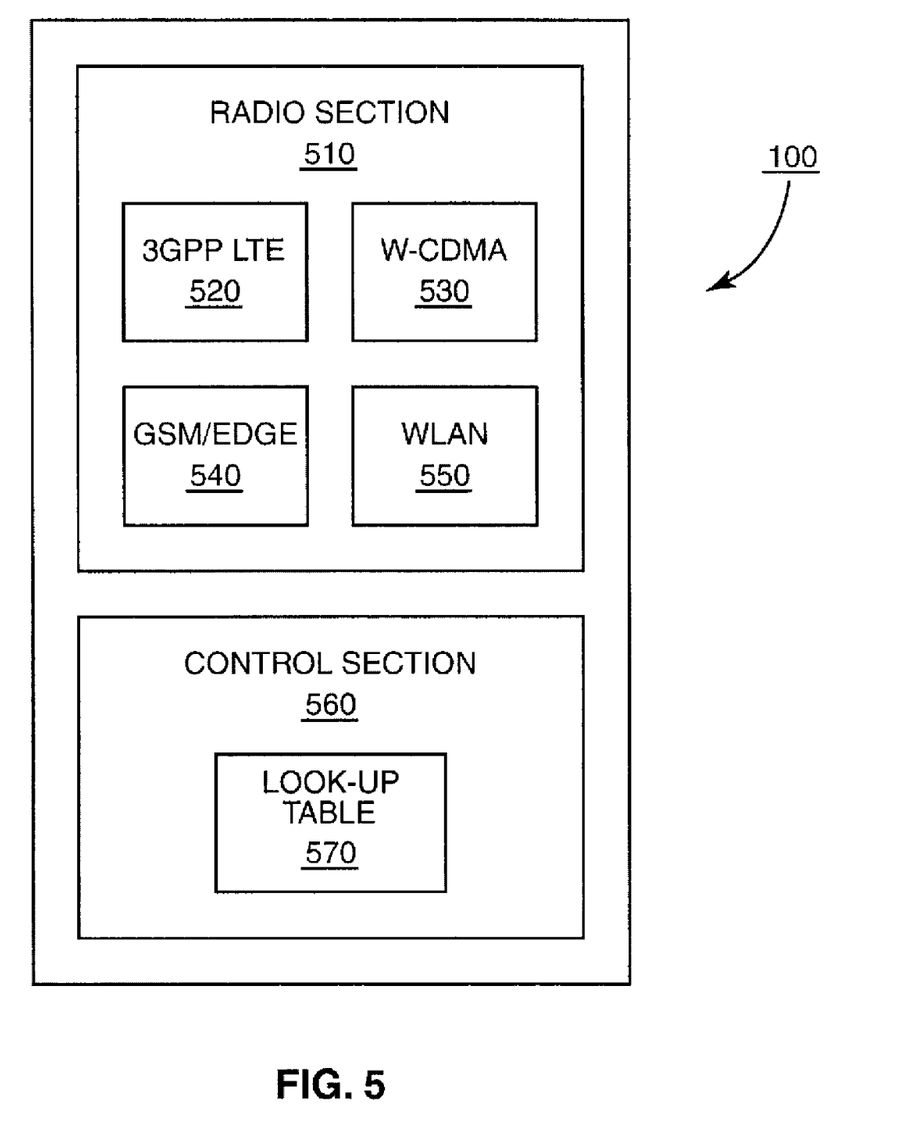
FIG. 5 is a block diagram of one embodiment of a wireless mobile communications device.

FIG. 5 illustrates functional blocks of an exemplary multi-mode wireless communications device 100 configured in accordance with the present invention.

Radio section 510 comprises circuitry configured to support multiple communications standards, each at one or several frequency bands. Specifically, blocks 520, 530, 540, AND 550 include circuitry, processing hardware and software compatible with one or more 3GPP LTE, W-CDMA, GSM, and WLAN standards, respectively. In particular, radio section 510 is configured to scan one or more frequency bands to determine a set of available radio access technologies that support a desired operating mode. Radio section 510 may also include circuitry configured to determine RAT-specific operating conditions, such as a RAT-specific path loss, by processing received signals. Those skilled in the art will readily appreciate that certain circuitry may be utilized by two or more of these functional blocks, while other circuitry and/or software may be specific to only one of several supported standards. The design and operation of radio sections compatible with these and other radio access technologies are well known to those skilled in the art, and therefore the specific details of such need not be discussed here.

Wireless device 100 also includes control section 560, which is configured to evaluate RAT-specific system parameters and RAT-specific operating conditions for each available RAT to select the RAT requiring the lowest energy consumption for the desired operating mode. Control section 560, which may be implemented in whole or in part as software executing on a general-purpose or specialized microprocessor, may also include a look-up table 570, implemented as a database stored in nonvolatile memory, which is accessed to retrieve parameters used in evaluating the RAT-specific system parameters and RAT-specific operating conditions. In particular, the look-up table 570 may comprise energy consumption parameters corresponding to a plurality of operating modes and to one or more RAT-specific system parameters and RAT-specific operating conditions.

Control section 560 is also configured to update the contents of look-up table 470, in response to software updates. These software updates may add support for an entirely new RAT, or may add support for features added to an existing RAT-type.

In one or more embodiments of wireless device 100, control section 560 is configured to determine a mobility parameter for wireless device 100. The mobility parameter may indicate an actual rate of motion by wireless device 100, or may simply indicate whether the wireless device 100 is stationary, moving slowly, moving quickly, etc. Control section 560 may derive the mobility parameter from signal processing data received from radio section 510, or may receive mobility data from a GPS receiver (not shown). Alternatively, a mobility parameter may be received or inferred from user input. In any event, the mobility parameter may be used by control section 510 in evaluating the RAT-specific system parameters and RAT-specific operating conditions to select a RAT requiring the lowest energy consumption by wireless device 100.

In several embodiments of wireless device 100, control section 560 is configured to evaluate a frequency band specific to one or more RATs, and to calculate a RAT-specific transmitter energy consumption requirement for each RAT as a function of the RAT-specific frequency band. Control section 560 may then incorporate this RAT-specific transmitter energy consumption requirement into an estimate for each RAT of the energy required to support a desired operating mode. Control section 560 then uses these estimates to select the RAT requiring the lowest energy consumption.

Wireless device 100 is thus configured to carry out one or more of the methods described above. With these and other variations and extensions in mind, those skilled in the art will appreciate that the foregoing description and the accompanying drawings represent non-limiting examples of the methods and apparatus taught herein for operating a multi-mode wireless communications device to select a radio access technology requiring the lowest energy consumption by the device for a desired operating mode. As such, the present invention is not limited by the foregoing description and accompanying drawings. Instead, the present invention is limited only by the following claims and their legal equivalents.

What is claimed is:

1. A method of operating a multi-mode wireless communications device, comprising:
   selecting a desired operating mode from a plurality of possible operating modes including at least an idle mode, a user-initiated speech mode and a network-initiated speech mode;
   scanning one or more frequency bands to determine a set of available radio access technologies that support the desired operating mode;
   for each radio access technology (RAT), determining RAT-specific system parameters including a discontinuous cycle parameter and RAT-specific operating conditions;
   determining an energy consumption metric as a function of the discontinuous cycle parameter for the desired operating mode and the RAT-specific operating conditions; and
   selecting a preferred RAT requiring the lowest energy consumption by the device based on the energy consumption metric for the desired operating mode, wherein said selecting of the preferred RAT is a function of the desired operating mode.

2. The method of claim 1, wherein the RAT-specific operating conditions include a RAT-specific path loss and wherein evaluating RAT-specific system parameters and RAT-specific operating conditions includes evaluating said RAT-specific path loss.

3. The method of claim 1, wherein the discontinuous cycle parameter is a discontinuous reception (DRX) cycle parameter.

4. The method of claim 1, wherein the discontinuous cycle parameter is a discontinuous transmission (DTX) cycle parameter.

5. The method of claim 1, wherein the RAT-specific system parameters for one or more RATs include a cell deployment density and wherein determining an energy consumption metric comprises determining the energy consumption metric as a function of the cell deployment density.

6. The method of claim 1, further comprising determining a mobility parameter for the mobile wireless communications device, and wherein determining the energy consumption metric is further based on the mobility parameter.

7. The method of claim 1, wherein the RAT-specific system parameters for one or more RATs include a RAT-specific frequency band.

8. The method of claim 7, wherein determining an energy consumption metric comprises calculating a RAT-specific transmitter energy consumption estimate as a function of the RAT-specific frequency band and determining the energy consumption metric as a function of the RAT-specific transmitter energy consumption estimate.

9. The method of claim 8, further comprising determining a data throughput requirement for the desired operating mode, and wherein calculating a RAT-specific transmitter energy consumption estimate comprises calculating the RAT-specific transmitter energy consumption estimate as a function of the data throughput requirement.

10. The method of claim 1, wherein the desired operating mode is an idle mode, and wherein selecting a preferred RAT comprises identifying the available RAT requiring the lowest energy consumption in the idle mode and selecting that RAT for idle-mode camping, and further comprising camping on the preferred RAT.

11. The method of claim 10, wherein the preferred RAT is different from a current RAT, the method further comprising de-registering from the current RAT and registering at the preferred RAT, before camping on the preferred RAT.

12. The method of claim 1, wherein the desired mode is a mobile-initiated speech mode, and wherein selecting a preferred RAT comprises identifying the available RAT requiring the lowest energy consumption in the mobile-initiated speech mode and selecting that RAT for cell reselection, and further comprising initiating a cell reselection to the preferred RAT.

13. The method of claim 12, wherein initiating a cell reselection to the preferred RAT comprises de-registering from a current RAT and registering at the preferred RAT.

14. The method of claim 1, wherein the desired mode is a network-initiated speech mode, and wherein selecting a preferred RAT comprises identifying the available RAT requiring the lowest energy consumption in the network-initiated speech mode and selecting that RAT, and further comprising requesting an inter-RAT handover to the selected RAT.

15. The method of claim 1, wherein the desired mode is an ongoing voice call, further comprising: when the preferred RAT is different from a RAT currently used by the multi-mode wireless communication device such that an inter-RAN handover would be required, determining whether the preferred RAT offers an improvement in energy consumption that meets a threshold requirement, and selectively requesting an inter-RAT handover based on that determination.

16. A multi-mode wireless communications device for operation with a plurality of radio access technologies (RATs), comprising:
   a multi-mode radio section configured to scan one or more frequency bands to determine a set of available RATs supporting a desired operating mode and to determine one or more RAT-specific operating conditions; and
   a control section configured to:
      select the desired operating mode from a plurality of possible operating modes including at least an idle mode, a user-initiated speech mode and a network-initiated speech mode;
      determine RAT-specific system parameters including a discontinuous cycle parameter and the RAT-specific operating conditions for each available RAT;
      determine an energy consumption metric as a function of the discontinuous cycle parameter for the desired operating mode and the RAT-specific operating conditions; and
      select the RAT requiring the lowest energy consumption by the device for the desired operating mode based on the energy consumption metric, as a function of the desired operating mode.

17. The multi-mode wireless communications device of claim 16, wherein the one or more RAT-specific operating conditions include a RAT-specific path loss.

18. The multi-mode wireless communications device of claim 16, wherein the control section comprises a look-up table comprising energy consumption parameters associated with the desired operating mode and with the available RATs, and wherein the control section is configured to evaluate the RAT-specific system parameters and the RAT-specific operating conditions using the energy consumption parameters.

19. The multi-mode wireless communications device of claim 18, wherein the control section is further configured to update the energy consumption parameters in the look-up table responsive to a software upgrade adding or modifying an access technology capability.

20. The multi-mode wireless communications device of claim 16, wherein the control section is further configured to determine a mobility parameter for the mobile wireless communications device, and wherein the control section is configured to evaluate the RAT-specific system parameters and the RAT-specific operating conditions using the mobility parameter.

21. The multi-mode wireless communications device of claim 16, wherein the RAT-specific system parameters include a RAT-specific frequency band, and wherein the control section is configured to calculate a RAT-specific transmitter energy consumption requirement for each RAT as a function of the RAT-specific frequency band and to evaluate the RAT-specific system parameters and the RAT-specific operating conditions using the RAT-specific transmitter energy consumption requirement.

22. The multi-mode wireless communications device of claim 16, wherein the control section is further configured to initiate access to the preferred RAT.

23. The multi-mode wireless communications device of claim 22, wherein the control section is configured to initiate access to the selected RAT by initiating a cell-reselection to the preferred RAT.

24. The multi-mode wireless communications device of claim 22, wherein the control section is configured to initiate access to the selected RAT by requesting an inter-RAT handover to the preferred RAT.

* * * * *

UNITED STATES PATENT AND TRADEMARK OFFICE
CERTIFICATE OF CORRECTION

PATENT NO. : 8,346,315 B2
APPLICATION NO. : 11/852726
DATED : January 1, 2013
INVENTOR(S) : Lindoff et al.

It is certified that error appears in the above-identified patent and that said Letters Patent is hereby corrected as shown below:

On the Title Page, in Item (56), under "OTHER PUBLICATIONS", in Column 2, Line 1, delete "Ramon." and insert -- Ramon, --, therefor.

On the Title Page, in Item (56), under "OTHER PUBLICATIONS", in Column 2, Lines 1-2, delete "Systems."" and insert -- Systems", --, therefor.

On the Title Page, in Item (56), under "OTHER PUBLICATIONS", in Column 2, Lines 2-3, delete "2006. MELECON 2006. IEEE Mediterranean. May 16-19, 2006, pp. 569-574." and insert -- 2006, MELECON 2006, IEEE Mediterranean, May 16-19, 2006, pp. 569-574, --, therefor.

On the Title Page, in Item (56), under "OTHER PUBLICATIONS", in Column 2, Line 6, delete "Communications."" and insert -- Communications", --, therefor.

In Column 10, Line 30, delete "look-up table 470," and insert -- look-up table 570, --, therefor.

Signed and Sealed this
Ninth Day of April, 2013

Teresa Stanek Rea
*Acting Director of the United States Patent and Trademark Office*